United States Patent [19]

Sadashige

[11] 3,977,933

[45] Aug. 31, 1976

[54] SLICED VENEER HAVING A COMBINATION OF WOOD GRAIN PATTERNS AND FANCY PLYWOOD THEREFROM

[76] Inventor: Takeshi Sadashige, 712-5, Ugai-cho, Fuchu, Hiroshima, Japan

[22] Filed: Sept. 6, 1974

[21] Appl. No.: 503,896

[30] Foreign Application Priority Data

Oct. 3, 1973 Japan .............................. 48-111778

[52] U.S. Cl. ................................ 156/250; 156/264; 156/293; 428/53; 428/54; 428/458; 428/464

[51] Int. Cl.$^{2}$ .......................................... B32B 31/00

[58] Field of Search .............. 161/37; 156/250, 264, 156/293; 428/53, 54

[56] References Cited

UNITED STATES PATENTS

| | | | |
|---|---|---|---|
| 108,781 | 11/1870 | Hamilton | 161/56 M |
| 220,893 | 10/1879 | Westcott | 156/265 X |
| 1,738,696 | 12/1929 | Elias | 156/264 |
| 1,935,480 | 11/1933 | Mencken | 41/35 |
| 2,287,573 | 6/1942 | Schneider | 156/293 X |
| 2,729,909 | 1/1956 | Buck | 156/293 X |
| 3,700,533 | 10/1972 | Schmitz | 161/413 X |
| 3,730,797 | 5/1973 | Jensen | 156/264 X |

*Primary Examiner*—Harold Ansher
*Assistant Examiner*—Patricia C. Ives
*Attorney, Agent, or Firm*—Frank J. Jordan

[57] ABSTRACT

A process for producing veneer and fancy plywood therefrom having a combination of wood grain patterns and line patterns includes cutting out a symmetrical pattern piece from a section of wood and inserting the pattern piece into a hole in a section of wood in which the hole has a cross sectional configuration corresponding to the cross sectional shape of the pattern piece. The pattern piece is inserted into the hole in a position different from the original position and is subsequently secured therein utilizing an adhesive. Slices of veneer are cut from the section of wood such that the sliced veneer includes wood grain patterns of the pattern piece and the section of wood.

11 Claims, 36 Drawing Figures

SLICED VENEER HAVING A COMBINATION OF WOOD GRAIN PATTERNS AND FANCY PLYWOOD THEREFROM

BACKGROUND OF THE INVENTION

The present invention relates to a process for producing sliced veneer and fancy plywood therefrom, and more particularly to a process for producing sliced veneer having unique and artistic combinations of wood grain patterns and line patterns.

In conventional processes for producing fancy plywood onto which a veneer of precious wood is glued, the natural wood grain of the precious wood has been hitherto mainly represented on the surface of such veneer, and in some cases there has been a few fancy plywoods in which there are appended line patterns by processing the surface of the plywood or veneer having various wood grain patterns. However, these arrangements were effected by manual or head operations on a small scale with a low yield, resulting in large amounts of scrap wood and a limited output. Therefore, the use of these known techniques for producing fancy plywoods has been limited to special cases because of the above mentioned disadvantages.

Accordingly, an object of the present invention is to overcome the disadvantages of known prior art arrangements and provide a new process to produce veneer and fancy plywood therefrom having artistic combinations of wood grain patterns and line patterns constantly without producing scrap wood.

Another object of the present invention is to provide a process for producing sliced veneer having unique and artistic combination of wood grain patterns and line patterns constantly and continuously.

A further object of the present invention is to provide a process for producing fancy plywood having unique and artistic combinations of wood grain patterns and line patterns by gluing a sheet of sliced veneer of wide area onto a desired substrate in a single operational step.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and operation of the invention, however, together with additional objects and advantages thereof will be best understood from the following description of specific embodiments when read in connection with the accompanying drawings.

SUMMARY OF THE INVENTION

A process for producing veneer having a combination of wood grain patterns includes the steps of cutting out a symmetrical pattern piece from a section of wood, removing the pattern piece from the section of wood, smoothing the side faces of the pattern piece, and inserting the pattern piece into a hole in a section of wood in which the hole has a cross sectional configuration corresponding to the cross sectional shape of the pattern piece. The pattern piece is inserted in the hole in a position different from the original position and is subsequently secured therein utilizing an adhesive. Slices of veneer are cut from the section of wood such that the sliced veneer includes wood grain patterns of the pattern piece and the section of wood.

BRIEF DESCRIPTION OF THE DRAWINGS

FIG. 2A is a plan view of a flitch showing the outline of two symmetrical pattern pieces to be cut out of the flitch such as by routing or the like.

FIG. 3A is a plan view of three flitches A, B, and C showing the outline of three symmetrical pattern pieces *a*, *b*, and *c* to be removed by routing or the like.

FIG. 3D is a plan view of a flitch showing the outline of three symmetrical pattern pieces to be cut out therefrom such as by routing or the like.

FIG. 3F is a plan view of three flitches of different kinds of wood showing the outline of symmetrical pattern pieces which are to be obtained therefrom such as by routing or the like.

FIG. 4A is a plan view of a flitch showing the outline of two symmetrical pattern pieces to be cut therefrom such as by routing or the like.

FIG. 4C is a plan view of a flitch showing the outline of two symmetrical pattern pieces to be cut therefrom such as by routing or the like.

FIG. 5A is a plan view of a flitch showing the outline of two symmetrical pattern pieces to be removed therefrom such as by routing or the like.

FIG. 7A is a perspective view of a composite flitch showing the outline of two symmetrical pattern pieces to be cut therefrom such as by routing or the like.

FIG. 7B is a perspective view of two other flitches also showing the outline of symmetrical pattern pieces to be cut therefrom such as by routing or the like.

DETAILED DESCRIPTION OF THE INVENTION

Figure 1A:
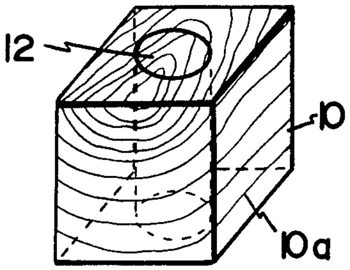
FIG. 1A is a perspective view of a single flitch showing the outline of a symmetrical pattern piece in the form of a cylinder which is to be removed by routing or the like from the flitch.
Figure 1B:
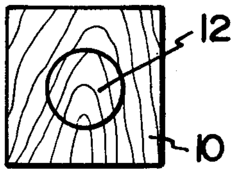
FIG. 1B is a plan view of the flitch shown in FIG. 1A showing the outline of the symmetrical pattern piece.

Referring to the drawings, FIG. 1A shows a wood flitch in which the grain of the wood is illustrated by the lines 10*a*. FIG. 1A further shows the outline of a symmetrical pattern piece 12 in the form of a cylinder. This symmetrical pattern piece 12 is cut out of the flitch 10 by means of a router, routing machine or fret saw.

As will be described hereinafter in greater detail, the cylindrical pattern piece 12 in FIG. 1A is merely one example of virtually an unlimited variety of different pattern pieces which may be cut from the flitch. Accordingly, the circular or cylindrical pattern shown in FIG. 1A is merely representative and has been selected to facilitate the description.

Figure 1C:
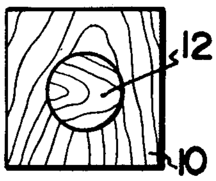
FIG. 1C is a plan view of the flitch shown in FIG. 1A but with the symmetrical pattern piece having been turned or rotated relative to its initial position.

After the pattern piece 12 has been cut from the flitch 10, the side faces of the pattern piece 12 are smoothed such as by utilizing sandpaper or the like. Subsequently the pattern piece 12 is placed or returned to the hole in the flitch from which the pattern piece 12 has been cut but in a different position. For example, FIG. 1C shows the pattern piece 12 returned to the opening in the flitch 10 but wherein the pattern piece 12 has been turned or rotated relative to its original position so that the wood grain pattern is no longer continuous with the adjacent wood grain pattern in the flitch. FIG. 1D illustrates a further arrangement wherein the pattern piece 12 has been inverted or turned upside down so that here again, the wood grain pattern of the piece 12 is not continuous with the adjacent wood grain pattern of the flitch. As will be described in greater detail further hereinafter, adhesive 13 is utilized between the pattern piece 12 and the hole in the flitch to secure the pattern piece within the hole.

Figure 1F:
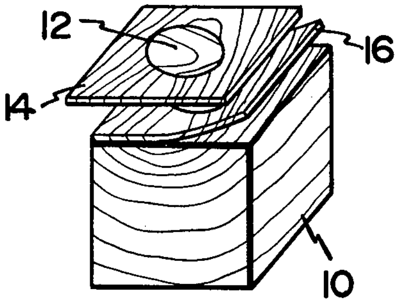
FIG. 1F is a perspective view showing the process of slicing sheets of veneer from the flitch.
Figure 1D:
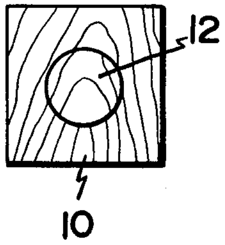
FIG. 1D is a plan view of the flitch shown in FIG. 1A in which the symmetrical pattern piece has been inverted relative to its initial position.
Figure 1E:
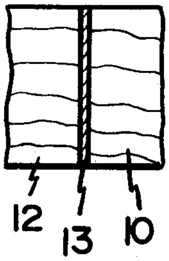
FIG. 1E is a partial sectional view of the flitch shown in FIG. 1C.

FIG. 1F is a perspective view showing the flitch 10 after the design piece 12 has been reinserted therein and suitably secured by adhesive and wherein the flitch is sliced into thin slices of veneer 14 and 16, with each slice of veneer including parts of the pattern piece 12 and flitch 10.

With the above arrangement it can be seen that since the position of the pattern piece 12 has been changed relative to its original position, the pattern of the grain of the wood on the pattern piece 12 and on the flitch 10 will not be continuous. This discontinuity or contrast in grain pattern is readily discernible in the drawings.

In the embodiments shown in FIGS. 1A to FIG. 1D inclusive, the design piece was replaced or reinserted in the same hole from which it was originally obtained. In the embodiment shown in FIGS. 2A to 2C, however, the design pattern piece is replaced in different holes. For example, in FIG. 2A there are shown pattern pieces 20 and 22 cut from a flitch 18. As can be seen in FIG. 2B these two pattern pieces 20, 22 have been interchanged so that the pattern piece 20 is disposed in the hole from which the pattern piece 22 was removed. Likewise, the pattern piece 22 is disposed in the hole remaining after the pattern piece 20 has been removed. FIG. 2C illustrates the inversion of the two pattern pieces 20 and 22 cut from the flitch 18.

Figure 3A:
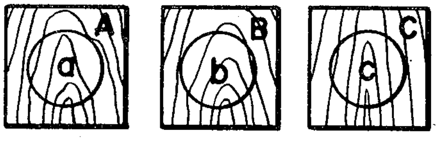
Figure 3B:
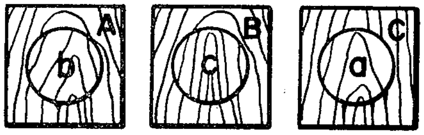
FIG. 3B is a plan view similar to FIG. 3A but wherein the symmetrical pattern pieces have been interchanged relative to their positions in FIG. 3A.
Figure 3C:
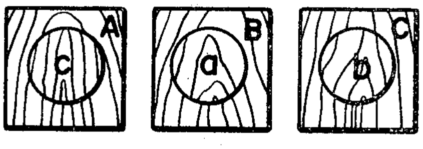
FIG. 3C is a plan view similar to FIG. 3A but again illustrating another interchanged position of the symmetrical pattern pieces in the flitches.

FIG. 3A shows another arrangement wherein three pattern pieces *a*, *b*, and *c* are cut from three flitches A, B, C respectively. FIG. 3B shows the same three flitches as in FIG. 3A but wherein the pattern pieces *a*, *b*, *c* have been interchanged as can be readily discerned by the letters used in the drawings to identify the flitches and pattern pieces. FIG. 3C is a view similar to FIG. 3B but shows a different interchanged arrangement of the design pieces in the flitches.

Figure 3D:
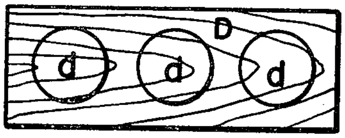
Figure 3E:
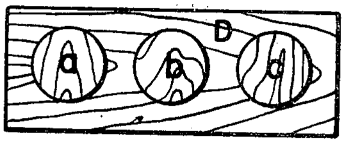
FIG. 3E is a plan view of the flitch shown in FIG. 3D but wherein symmetrical pattern pieces obtained from the three flitches shown in FIG. 3F have been used.
Figure 3F:
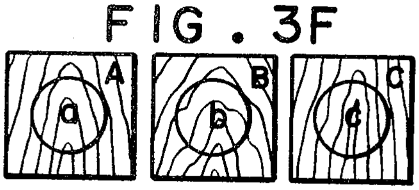
Figure 3G:
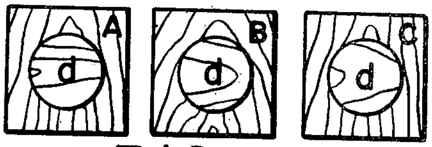
FIG. 3G is a plan view of the three flitches shown in 3F but wherein the symmetrical pattern piece cut from the flitch in FIG. 3D are utilized.

FIG. 3D shows a flitch D of one particular kind of wood in which three design pieces d have been cut. These three design pieces d are inserted in corresponding holes in the flitches A, B, and C shown in FIG. 3G representing three different kinds of wood. At the same time, the holes in the three flitches A, B, and C in FIG. 3G have been provided by removing corresponding design pieces *a*, *b* and *c* as shown in FIG. 3F. These design pieces *a*, *b*, and *c* are placed in the flitch D as shown in FIG. 3E, such flitch D being the same as that shown in FIG. 3D from which the three design pieces d were obtained. With this arrangement, it will be seen that all of the flitches and design pieces have been utilized whereby there is no scrap or waste or loss of material. At the same time, it can be seen that virtually an unlimited number of wood grain pattern variations may be obtained.

Figure 5C:
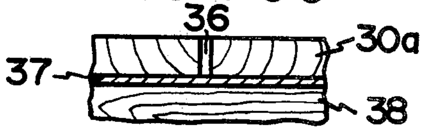
FIG. 5C is a partial sectional view of a slice of veneer mounted on a substrate.
Figure 5A:
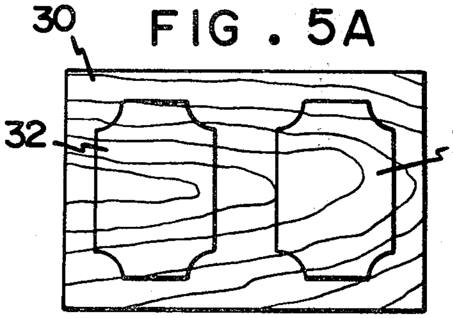
Figure 5B:
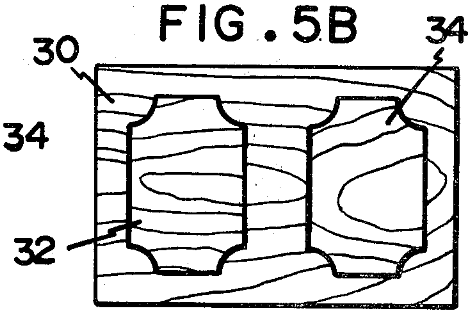
FIG. 5B is a plan view of the flitch shown in FIG. 5A but wherein an interchange of the symmetrical pattern pieces has been effected and further illustrating the line pattern which is obtained by using colored adhesive.

FIG. 5A shows a flitch 30 along with the outline of two pattern pieces 32 and 34 which are to be cut therefrom. FIG. 5B shows the same flitch 30 in which the pattern pieces 32 and 34 have been reinserted in the holes from which they were cut but in which they have turned as will be evident upon comparing the pattern of the grain of the wood in FIGS. 5A and 5B. Adhesive is used to secure the design pattern 32 and 34 to the flitch 30 after these design patterns have been turned and reinserted in the flitch 30. As may be desired the adhesive may be colored with dyes, pigments, or mixtures thereof and thereby produce a combination of wood grain patterns and line patterns whereby the artistic coloring becomes deeper. By way of example, dyes stuch as alizarine red S, methylene blue, Sudan II, azo type dyestuff and cyanine type dyestuff may be used and added to the adhesive. Also, pigments such as titanium white, red iron oxide, chrome yellow, and the like may be mixed with the adhesive.

As a further alternative arrangement a transparent adhesive may be used. Thus it can be seen that when a sliced sheet of veneer is made from the flitch 30 shown in FIG. 5B and secured on a substrate, it will be possible to see the portions of the substrate through the transparent adhesive. Accordingly, the color or design pattern of the substrate to the extent that the latter can be seen through the transparent adhesive will become a part of the overall design appearance of the veneer sheet. Thus if the substrate itself is made of wood and has a particular pattern of wood grain, then this pattern would form part of the design of the veneer to the extent that the pattern can be seen through the transparent adhesive. Also the substrate may be made of different colors and have different design effects as may be desired. For example, the substrate may be colored with different colors or it may be made of plywood itself.

Figure 6A:
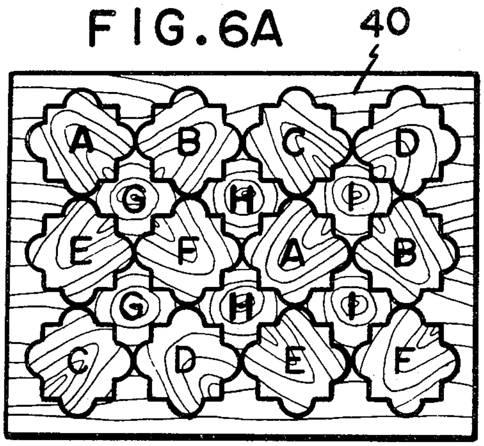
FIG. 6A is a plan view of a flitch in which a plurality of pattern pieces as shown in FIGS. 6B, 6C and 6D have been utilized.
Figure 6B:
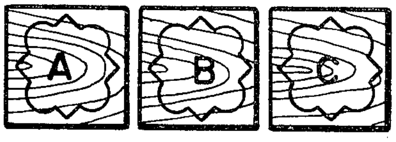
FIGS. 6B, 6C, and 6D are plan views of flitches showing the outline of symmetrical pattern pieces removed therefrom and utilized in connection with the flitch shown in FIG. 6A.
Figure 6C:
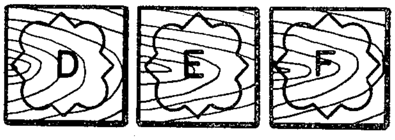
Figure 6D:
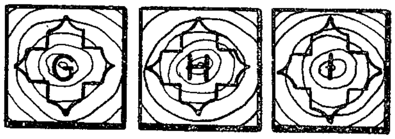
Figure 4A:
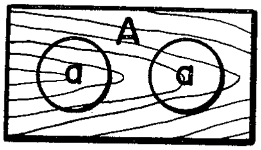
Figure 4B:
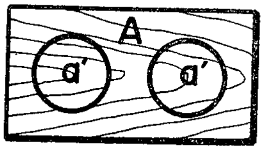
FIG. 4B is a plan view of the same flitch shown in FIG. 4A but which includes symmetrical pattern pieces obtained from the flitch shown in FIG. 4C.
Figure 4C:
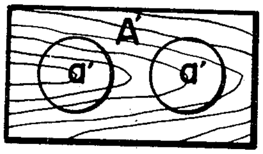
Figure 4D:
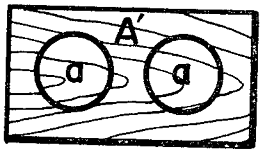
FIG. 4D is a plan view of the flitch shown in FIG. 4C but utilizing the symmetrical pattern pieces cut from the flitch shown in FIG. 4A.

As a further alternate arrangement, suitable materials such as paper, metallic film, or sliced veneer of different kinds of wood may be provided between the sliced veneer and a substrate to enhance the aesthetic effect. In this regard FIG. 5C shows such a thin sheet of material 37 interposed between a slice of veneer 30*a* made from the flitch 30 shown in FIG. 5B and the substrate 38. It will be apparent that the design pattern of the interposed sheet 37 can be viewed through the transparent adhesive 36.

Where it is desired to emphasize or provide a greater variation in the pattern of the wood grain, it is possible to cut out desired symmetrical pattern pieces from other small flitches of different kinds by means of a router, routing machine, or fret saw as shown in FIGS. 6A through 6D. Thus FIGS. 6B and 6C illustrate a plurality of flitches in which the pattern pieces A, B, C, D, E and F of identical configuration are cut therefrom. FIG. 6D shows identical design piece G, H and I of a different configuration cut from different flitches. FIG. 6A shows a flitch 40 in which the various design pieces in FIGS. 6B, 6C, 6D have been inserted to thereby provide the design effect shown in FIG. 6A. It will be seen that the design patterns A through F may be inserted interchangeably within the corresponding holes in the flitch 40. Likewise the flitches G, H, and I may be inserted interchangeably into the corresponding holes in the flitch 40.

According to the present invention, any desired symmetrical pattern pieces may be cut or routed from a desired part of a plurality of flitches of different kinds of wood or from different flitches of the same kind of wood and inserted into the holes of other flitches interchangeably, turning them to any desired angle relative to the axis of the routing direction, or inverting them whereby the wood grain pattern between the flitch and the design pieces become discontinuous. In this manner virtually an unlimited variation and combination of wood grain patterns may be obtained. In cases where colored adhesive is used between the flitch and the design piece inserted therein, it is possible to provide further combinations and variations of the patterns thereby increasing the flexibility and further possible combinations which may be utilized to enhance and provide the desired artistic or aesthetic effect.

As described hereinabove in connection with FIG. 5, transparent adhesive may be used and further, a sheet of material having desired aesthetic affects may be interposed between the sheet of veneer cut from the flitches, made as described above, and the substrate whereby the sheet of material may be viewed through the transparent adhesive. In cases where it is desired to utilize and emphasize the various combination of wood grain patterns, flitches may be used made from different kinds of wood having different grain patterns and colors, such as teak, rosewood, walnut, red oak, birch, Zelkova and so on, and cutting out the desired pattern pieces from these flitches and reinserting them interchangeably to attain the desired aesthetic effect.

Figure 7A:
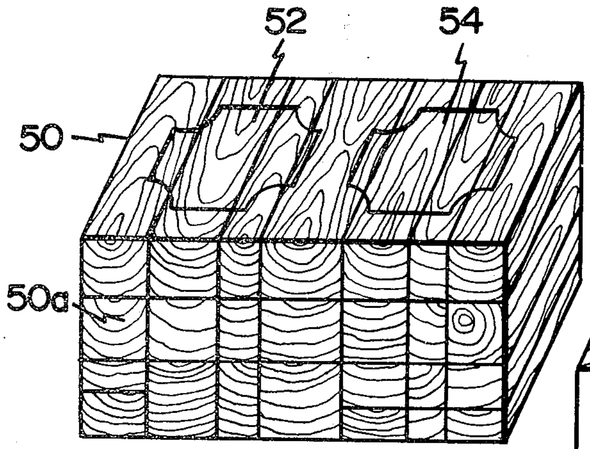
Figure 7B:
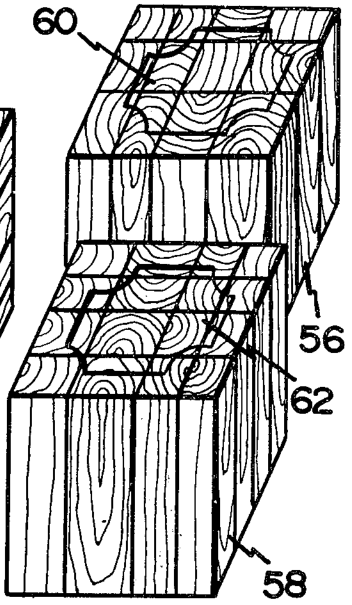
Figure 7C:
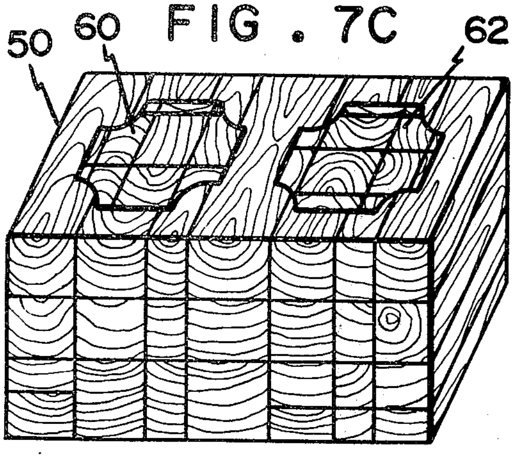
FIG. 7C is a perspective view of the flitch shown in FIG. 7A in which the two pattern pieces obtained from the flitches in FIG. 7B are utilized.

By way of example, referring to FIGS. 7A to 7C inclusive, it is possible to provide a composite flitch 50 made up of glued smaller flitches 50*a* in which the grain of the smaller flitches 50*a* which make up the composite flitch 50 extend in a generally horizontal direction. Two pattern pieces 52 and 54 are cut from the composite flitch 50 as shown in FIG. 7A. Two additional composite flitches 56 and 58 are provided from which two pattern pieces 60 and 62 respectively are cut. However, in this case, the pattern pieces 60 and 62 are cut with the vertical axis of the router disposed generally parallel to the grain of the wood, whereas in FIG. 7A, the holes in the flitch 50 are made by removing design patterns 52 and 54 cut with the vertical axis of the router disposed generally perpendicular to the wood grain pattern. This aforementioned difference can be readily discerned upon comparing FIGS. 7A and 7B. FIG. 7C shows the pattern pieces 60 and 62 cut from the flitches 56 and 58 respectively inserted in the holes in the composite flitch 50.

Figure 8A:
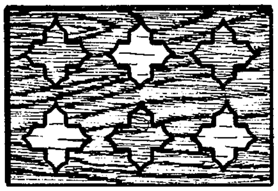
FIG. 8A to 8F inclusive are plan views of flitches showing the outline of symmetrical pattern pieces thereon and illustrating three kinds of wood grain patterns which can be obtained utilizing three different kinds of wood of different color.
Figure 8B:
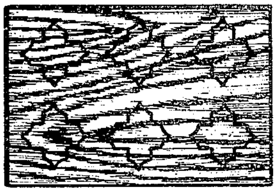
Figure 8C:
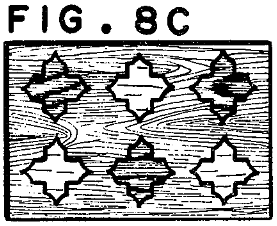
Figure 8D:
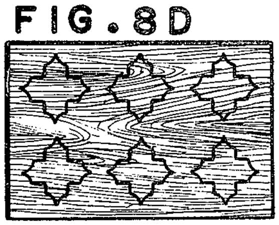
Figure 8E:
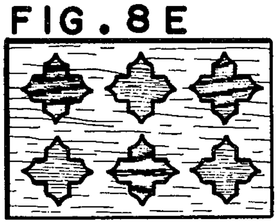
Figure 8F:
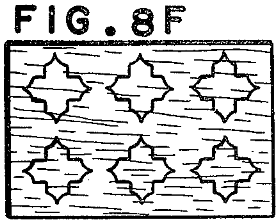

Furthermore, referring to FIGS. 8A to 8F inclusive, desired pattern pieces are routed out from the three large flitches made from three different kinds of woods which differ in grain pattern and color, for example, Kalopanax (white), as shown in FIG. 8A, Saperre (light-brown) as shown in FIG. 8C and Walnut (ashy purple) as shown in FIG. 8E. The thus obtained pattern pieces are inserted interchangeably into the holes of the three large flitches as shown in FIGS. 8B, 8D, and 8F respectively, whereby three kinds of veneer which are highly decorative and outstanding in appearance can be obtained by slicing the above large flitches, and further, an outstanding fancy plywood can be obtained by gluing the veneer onto a desired substrate.

When using a plurality of different kinds of flitches for example *n* different kind of flitches or *n* pieces of flitches of the same kind in different patterns, it is possible to obtain $n(n-1)$ combinations. In the case of combining the various ways of turning or rotating the pattern pieces to the desired angle or inverting them with the above combination, several times as many combinations as above may be obtained whereby sliced veneer having various and unlimited or virtually unlimited variation in patterns can be obtained. Moreover $n + 1$ kinds of combination patterns can be obtained, for example with the arrangement as shown in FIGS. 3D, 3E and 3F by interchanging *n* pattern pieces which are respectively routed from *n* small flitches with *n* similar pattern pieces routed from a large flitch.

In either case the present invention does not produce any extra scrap wood due to the routing out of the pattern pieces from various flitches and reinserting them into the flitches interchangeably. Moreover, according to the present invention, it is possible to obtain sliced veneer and fancy plywood onto which the veneer is glued having discontinuous and combined wood grain patterns which cannot be obtained by the natural wood itself.

Also the above mentioned processes can be carried out at an elevated moisture content before slicing the glued flitches or composite flitches so as to avoid damage which might otherwise result during slicing of the veneer to thereby obtain beautiful and undamaged sliced veneers. Slicing is usually carried out perpendicular to the routing direction, but in some cases it may be carried out at a fixed angle as may be desired. Moreover, in cases where more minute combinations of wood grain pattern are required, it is necessary to avoid distortion and splitting caused by stress because of the difference in the dimensional change between the pattern pieces and the flitches according to the change of wooden moisture content. It is, therefore, preferable to carry out the whole process including routing of the design pieces, inserting and gluing them into the holes interchangeably, and slicing the flitches to obtain sliced veneer at an elevated moisture content, that is, at the moisture content of the wood at or above the fiber saturation point (f. s. p.) which is a critical point of physical change in the wood.

The adhesive for gluing the inserted pattern pieces in the holes as well as for gluing single flitches together to make a composite flitch, may include various adhesives for wood such as, for example, phenolic resin, urea resin, vinyl acetate emulsion, gum resin, melamine resin, epoxy resin, polyester resin, cyano acrylate resin, ethylene glycol dimethacrylate, and polyurethane resin adhesives. Among these, it is preferable to use solventless type adhesives such as epoxy, polyester, cyano acrylate, and polyurethane resins which result in minimal cubic contraction and which can be glued at a low pressure. In particular, when all of the steps are carried out at the moisture content at or above the f.s.p., underwater curing type adhesives which are reactive with water and cured to develop adhesiveness may be used such as, for example, polyurethane resin and polyurethane adhesives of the underwater curing type can be preferably used. Also any other underwater adhesive which is cured to develop adhesiveness by reacting with water are suitably employable in gluing the pattern pieces to the holes as well as in gluing single flitches together to make a composite flitch. Alternatively, epoxy resin adhesive may be used including any adhesive capable of curing even in the presence of moisture such as moisture-curing epoxy resin adhesive together with polyamides or aromatic amine as the curing agent. These adhesives can be used at room temperature, but upon heating, the curing period can be reduced. The applying pressure is usually in the range of 4–8 kg/cm$^2$, and the curing period at room temperature is 1.5 to 10 hrs in the former case and about 24 hrs in the latter case.

Furthermore, the concept of the present invention may be applicable either to a single flitch or to a composite flitch. Thus, a large sliced veneer having various combinations of wood grain patterns may be obtained by making a large composite flitch by means of gluing various single flitches in piles or in rows, and routing out a desired symmetrical pattern piece from the composite flitch as shown in FIGS. 7A, 7B, and 7C. Moreover *n* fancy plywood having artistic wood grain patterns and line patterns can be obtained by gluing various kinds of sliced veneer obtained as described hereinbefore onto various substrates.

Figure 2A:
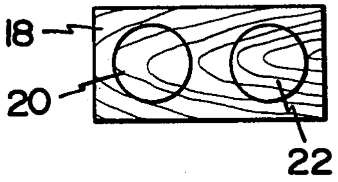
Figure 2B:
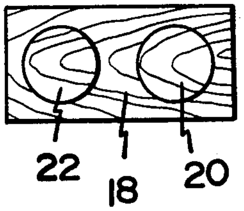
FIG. 2B is a plan view similar to FIG. 2A but wherein the two symmetrical pattern pieces have been interchanged.
Figure 2C:
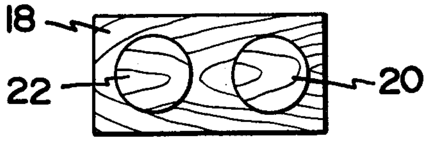
FIG. 2C is a plan view similar to FIG. 2A. but wherein the two symmetrical pattern pieces have been inverted relative to their original position.

Thus the present invention is concerned with a process for producing sliced veneer and further fancy plywood having a combination of wood grain patterns, the latter being obtained by gluing the thus obtained veneer onto a desired substrate, and which, according to one embodiment of the invention, includes the following steps:

A. cutting out any desired symmetrical pattern pieces from one side of flitches or composite flitches to the opposite direction by means of a router, routing machine, or fret saw, smoothing the side faces of the pattern pieces, and inserting the pattern pieces back into the holes in the following ways:

1. inserting the pattern pieces in a turned or rotated position relative to the original position
2. inserting the pattern pieces in an inverted position
3. inserting similar shaped pattern pieces removed from other holes to the corresponding position interchangeably as shown in FIGS. 2A, 2B and 2C for example
4. inserting the pattern pieces by combining the above ways (1), (2), and (3)

B. cutting out any desired symmetrical pattern pieces from one side of flitches or composite flitches obtained from the same or different kinds of woods to the opposite direction by means of a router, routing machine or fret saw, smoothing the side faces of the pattern pieces, and inserting the pattern pieces into the holes of other flitches or composite flitches of different kinds of wood as shown in FIGS. 3A, 3B, 3C or into the holes of other flitches of composite flitches of the same kind of wood as shown in FIGS. 4A, 4B, 4C, 4D in the following ways:

1. inserting similar shaped pattern pieces taken from other flitches or composite flitches to the corresponding position of the hole interchangeably
2. inserting similar shaped pattern pieces taken from other flitches or composite flitches to the turned or rotated position of the hole interchangeably
3. inserting similar shaped pattern pieces taken from other flitches or composite flitches to the inverted position
4. inserting the pattern pieces in the manner of combining the above ways (1), (2), and (3)

then gluing the above pattern pieces in the holes by filling and setting adhesives, either colorless or colored, in the space between the pattern pieces and the holes, and slicing the thus prepared flitches or composite flitches at a right angle or a desired angle relative to the routing direction at a desired thickness to obtain sliced veneers.

According to the present invention, the wood grain pattern between the part where the above mentioned pattern piece is interchanged and the adjacent part thereto becomes discontinuous by routing out a desired symmetrical pattern piece from a desired part of the flitch and fitting back the piece into the original hole by any of the above ways of (A), (1)–(4), and there can be obtained a combination of wood grain patterns. Moreover, in the case that the adhesives which are used between the pattern pieces and holes are colored with dyestuffs, pigments, or mixtures thereof, there is produced a combination of wood grain patterns and line patterns, and the artistic coloring becomes deeper. Furthermore, in the case where colorless adhesive is used, a combination of wood grain patterns which provide transparent impressions can be obtained. In this case, more perspective patterns can be presented by coloring with dyestuffs or pigments the substrate of the fancy plywood or by interposing paper, metallic film, or sliced veneer of different kinds of wood between the substrate and the sliced veneer obtained by the above process.

Furthermore, according to the present invention, any desired symmetrical pattern pieces which are cut or routed out from a desired part of several flitches of different kinds of wood or from different flitches of the same kind of wood may be inserted in the holes of other flitches by any of the above ways of (B), (1)–(4), that is, inserting them interchangeably, turning them the desired angle on the axis of the routing direction, or turning them upside down, whereby the wood grain pattern between the flitch and the above pieces becomes discontinuous, and various combinations of wood grain patterns can be obtained.

It is thought that the invention and many of its attendant advantages will be understood from the foregoing description and that it will be apparent that various changes may be made in the form, construction, and arrangements of the parts without departing from the spirit and scope of the invention or sacrificing all of its material advantages. The form heretofore described being merely a preferred embodiment thereof.

What is claimed is:

1. A process for mass-producing from a block of wood a plurality of thin sheets of wood veneer having a combination of wood grain patterns comprising the steps of cutting out an elongated pattern piece from said block of wood, said block of wood having a height substantially greater than the thickness of the veneer to be produced, said elongated pattern piece being symmetrical about an imaginary longitudinal plane and having a longitudinal length corresponding to the height of said block of wood, removing said elongated pattern piece from said block of wood by withdrawing said elongated pattern piece parallel to its longitudinal axis to thereby leave remaining in said block of wood an elongated hole, inserting said elongated pattern piece into a corresponding elongated hole in a block of wood, said elongated hole being symmetrical about an imaginary longitudinal plane and having a cross sectional configuration corresponding to the cross sectional configuration of said elongated pattern piece, said elongated pattern piece being inserted in said elongated hole in a position different from the original position such that the grain of said elongated pattern piece and the grain in said block of wood in which the elongated pattern piece is inserted is discontinuous to thereby provide a visual contrast therebetween, securing said elongated pattern piece within said elongated hole utilizing an adhesive, cutting a plurality of relatively thin slices of wood veneer from said block of wood in a direction generally transversely of said imaginary dividing plane of said elongated pattern piece and of said elongated hole in which said elongated pattern piece is inserted, whereby said plurality of relatively thin slices of wood veneer embody contrasting wood grain patterns of said elongated pattern piece and said block of wood, and carrying out the above mentioned steps while maintaining the moisture content of said block of wood and said elongated pattern pieces at or above the fiber saturation point.

2. A process according to claim 1 wherein said pattern piece is cut from a block of wood in the form of a single flitch.

3. A process according to claim 1 wherein said pattern piece is cut from a block of wood in the form of a composite flitch.

4. A process according to claim 1 wherein said block of wood into which said pattern piece is inserted is in the form of a single flitch.

5. A process according to claim 1 wherein said block of wood into which said pattern piece is inserted is in the form of a composite flitch.

6. A process according to claim 1 wherein said pattern piece is inserted in a block of wood which is different from the block of wood from which the pattern piece was cut.

7. A process according to claim 1 wherein said step of securing said pattern piece within said hole is effected utilizing a colored adhesive.

8. A process according to claim 1 wherein said step of securing said pattern piece within said hole is effected utilizing a transparent adhesive.

9. A process according to claim 8 wherein said step of securing said pattern piece within said hole is effected utilizing a transparent adhesive such that a portion of said member is viewable through said transparent adhesive.

10. A process for producing fancy plywood comprising the step of gluing at least one slice of veneer made according to the method of claim 1 onto a wood substrate.

11. A process according to claim 10 including the step of interposing between said sliced veneer and said substrate one member selected from the group consisting of paper, metallic film and wood.

* * * * *